March 19, 1957  A. J. HAYNES ET AL  2,786,196
PILOT LIGHT

Filed June 14, 1954  2 Sheets-Sheet 1

INVENTOR
ARTEMAS J. HAYNES
EARLE F. ALLEN
BY
Norman Holland
ATTORNEY

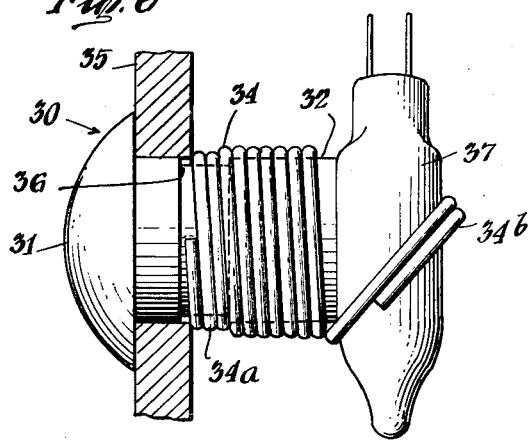
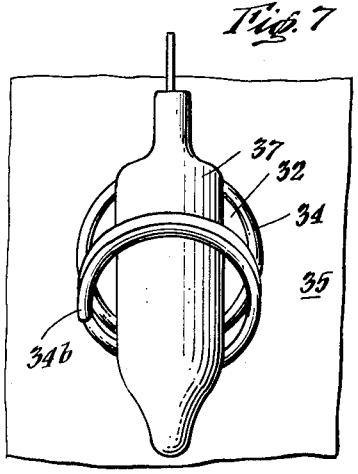
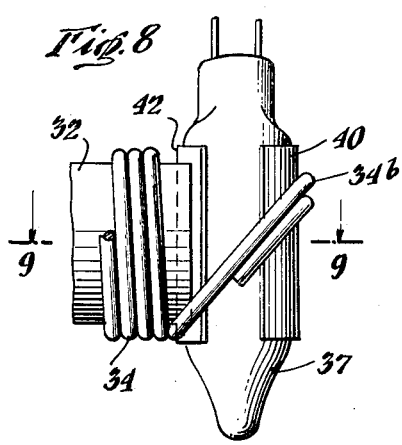
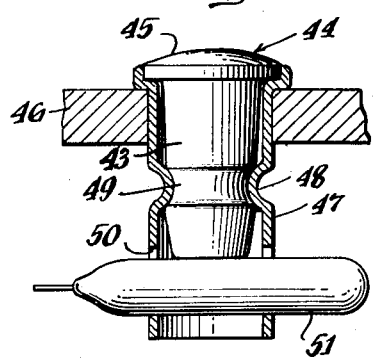
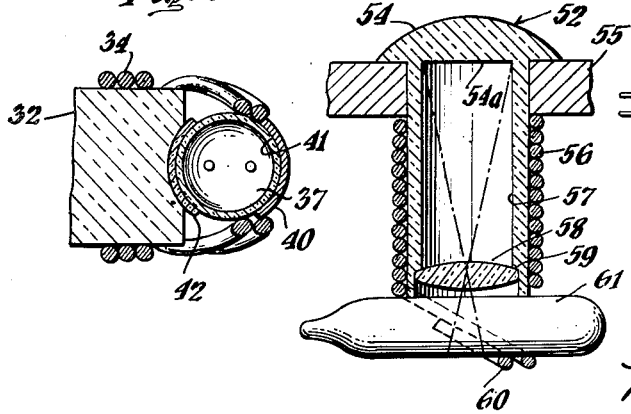
INVENTOR
ARTEMAS J. HAYNES
EARLE F. ALLEN
BY
ATTORNEY

United States Patent Office 2,786,196
Patented Mar. 19, 1957

2,786,196

PILOT LIGHT

Artemas J. Haynes, South Yarmouth, and Earle F. Allen, Norwell, Mass., assignors to Valentine E. Macy, Jr., New York, N. Y.

Application June 14, 1954, Serial No. 436,339

10 Claims. (Cl. 340—381)

The present invention relates generally to pilot lights and more particularly to a pilot light adapted to mount a socketless lamp in a position parallel to the instrument panel. The assembly is particularly suited for mounting miniature neon lamps which have no socket base and which are now manufactured in extremely small sizes.

Previous pilot lights adapted for use with baseless lamps have been complex and relatively expensive assemblies or the lamps have been mounted in an end-on position with respect to the instrument panel. Previous pilot lights for baseless lamps also have had numerous parts making the original mounting and replacement of the lamps difficult. The pilot light of the present invention has a minimum number of parts and provides a simple and effective method of mounting the baseless lamps. In addition, the pilot light of the present invention provides for maximum utilization of the illumination provided by the baseless type of lamp, such as neon lamps, so that a bright light results even with lamps of extremely low wattage.

An object of this invention is to provide an improved pilot light.

Another object of the invention is to provide a pilot light for baseless lamps.

Another object of the invention is to provide a pilot light which mounts baseless lamps in a position generally parallel to the instrument panel surface to insure the exposure of the maximum illuminated lamp area to the jewel.

Another object of the invention is to provide a relatively simple pilot light having an efficient light transmission means.

Another object of the invention is to provide a pilot light which is easily installed and in which the lamps may be easily replaced.

A still further object of the invention is to provide a pilot light for low-power miniature baseless neon lamps.

Other and further objects of the invention will be obvious upon an understanding of the illustrated embodiment about to be described or will be indicated in the appended claims, and various advantages not referred to herein will occur to one skilled in the art.

A preferred embodiment of the invention has been selected for purposes of illustration and description and is shown in the accompanying drawings wherein:

Fig. 6 is a side elevational view partially in section of another embodiment of the pilot light using a coiled spring clip to mount the lamp;

Fig. 7 is a rear elevational view of the light of Fig. 6;

Fig. 8 is a fragmentary view of the pilot light shown in Fig. 6 having reflector and coloring means added;

Fig. 9 is a sectional view taken along the lines 9—9 of Fig. 8;

Fig. 10 is a side elevational view partially in section of another embodiment having a tubular clamp;

Fig. 11 is an end view of the light of Fig. 10; and

Fig. 12 is another embodiment of the light of Fig. 6 having a light focusing lens included.

Figure 1:
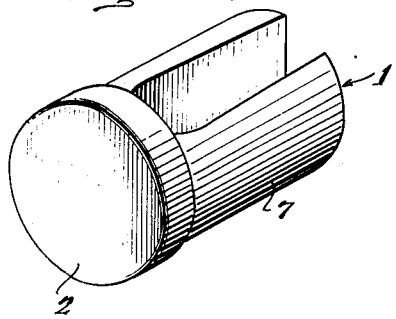
Fig. 1 is a perspective view of one embodiment of the pilot light.
Figure 2:
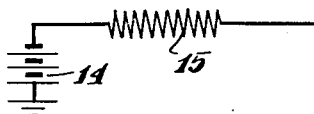
Fig. 2 is a rear elevational view of the light of Fig. 1 mounted on an instrument panel with a baseless neon lamp.
Figure 3:
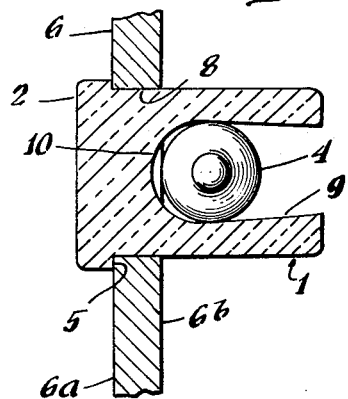
Fig. 3 is a sectional view taken on the lines 3—3 of Fig. 2.

The pilot light 1 shown in Figs. 1 through 3 comprises a unitary structure formed from a material pervious to light, such as glass or plastic. It has a jewel portion 2 which, as seen in Fig. 3, rests on the outside of the instrument panel 6 to provide a visual indication when the lamp 4 is illuminated. The jewel portion 2 of the pilot light 1 preferably has a shoulder portion 5 which abuts the front 6a of instrument panel 6 to hold the jewel in a given position relative to the panel 6. Behind the jewel portion 2 is a lamp mounting portion 7 which extends rearwardly through the aperture 8 in the panel 6 to hold the pilot light in place on panel 6 and to mount the lamp 4. The lamp 4 is mounted on portion 7 by being inserted in a slot 9. Slot 9 is approximately U-shaped to hold lamp 4 firmly in place against the rear surface 6b of panel 6. Slot 9 preferably has a gradually increasing width as it approaches the curved end portion 10 so that the outer surface of lamp 4 will engage the edge of the slot and will tend to be held against surface 6b by the slope of the slot 9. The rounded end portion 10 of slot 9 is curved to pass slightly forwardly of rear surface 6b to insure that lamp 4 contacts panel 6 rather than the rounded portion 10 of the slot. When pilot light 1 is made of a resilient plastic, the width of the slot may be made slightly smaller than the diameter of the lamp to insure a gripping action of slot 9 on lamp 4. When a less elastic material is used, the slot 9 will be proportioned to provide a friction fit between lamp 4 and slot 9.

The pilot light assembly 1 is mounted on an instrument panel in any given location by drilling an aperture 8 in the panel at that point with a diameter slightly larger than support portion 7 of the pilot light 1. The support portion 7 of the pilot light assembly 1 is then inserted into the aperture so that its jewel portion 2 has shoulder portion 5 abutting front surface 6a of the panel 6. The lamp, such as baseless neon lamp 4, is then slipped adjacent to portion 10 of slot 9 so that the lamp is parallel to and in contact with the rear surface 6b of panel 6. It can now be seen that pilot light 1 is firmly mounted on panel 6 due to the gripping action of shoulder 5 of the jewel 2 in conjunction with the contact of lamp 4 against panel 6. Since portion 7 is made of the same light pervious stock as jewel 2, it will conduct the light rays from the lamp 4 directly to jewel 2. Jewel 2 may be shaped as desired to disperse the light rays from lamp 4. Jewel 2 may be given a cylindrical shape as in Fig. 1, convex shapes as shown in Figs. 4 and 6, or any other suitable shape as desired.

Figs. 2 and 3 show pilot lamp 1 mounted on panel 6 with a typical miniature neon lamp 4. These neon lamps have two projecting wires 11 for terminals. These wires 11 may be soldered as shown or clipped or otherwise fastened to lead wires 12 which are connected to a suitable voltage source 14. This source may be A. C. or D. C., as desired. With neon lamps a resistor 15 is used in series with the lamp 4 to limit the current flow. Other miniature types of lamps whose bulb portions fit slot 9 may be used and suitable power connections are then made by the use of solder, clips, plugs or other fasteners as necessary.

Figure 4:
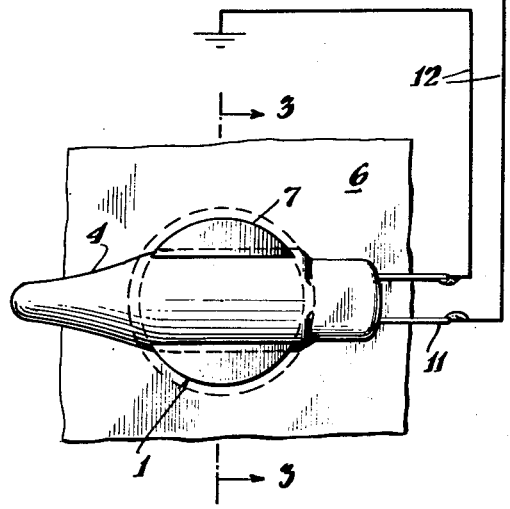
Fig. 4 is a side elevational view partially in section of another embodiment of the pilot light using a flexible clip to hold the neon lamp.
Figure 4:
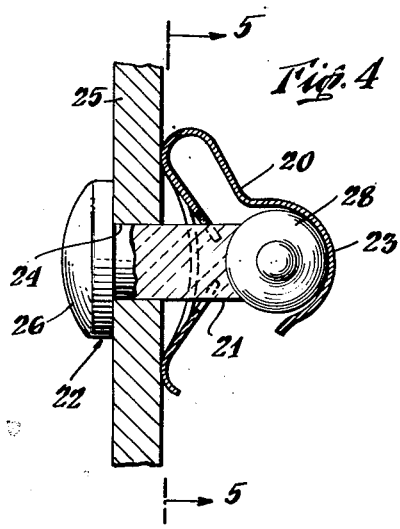
Figure 5:
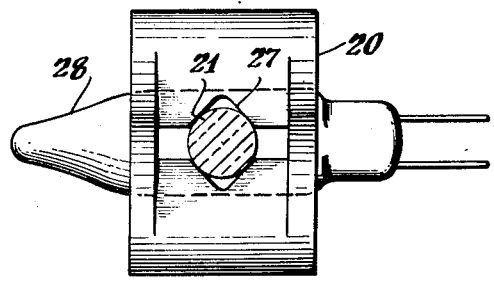
Fig. 5 is a sectional view taken along the lines 5—5 of Fig. 4.

Figs. 4 and 5 show another embodiment of the pilot light in which the slot 9 is replaced by a spring metal clip 20. Pilot light 22 has a forward jewel portion 26 which abuts the front of panel 25 and a rearwardly extending lamp mounting portion 21. Lamp mounting portion 21 passes through aperture 24 in panel 25 and supports lamp 28 which is held thereon by spring clip 20. Spring clip 20 has a slot 27 adapted to resiliently grip lamp mounting portion 21 so that the clip 20 may be forced against panel 25 to hold the pilot light 22 in place on panel 25. Clip 20 has a rear curving portion 23 with a semi-circular shape adapted to hold lamp 28 against the rear end of portion 21. Pilot light 22 is mounted on a panel such as panel 25 by first forming an aperture 24 in panel 25 which corresponds to the shape of lamp mounting portion 21. Pilot light 22 is now placed on the panel by inserting lamp mounting portion 21 into aperture 24 so that jewel portion 26 abuts the front of panel 25. The slotted portion 27 of clip 20 is now fitted over lamp mounting portion 21 and clip 20 is forced against the rear side of panel 25 so that the panel 25 is gripped between jewel 26 and clip 20. Lamp 28 is now slipped under portion 23 of clip 20 which holds lamp 28 against the end of lamp mounting portion 21. Light rays from lamp 28 are conducted by light pervious lamp mounting portion 21 to jewel 26.

Figs. 6 and 7 show another embodiment of the pilot light in which the metal clip member 27 of the pilot light 22 shown in Figs. 4 and 5 is replaced by a helical spring clip 34. Pilot light 30 comprises a jewel portion 31 similar to jewel portions 2 and 26, previously discussed, and a lamp portion 32 extending rearwardly therefrom and preferably formed from the same light permeable material as the jewel. A helical spring 34 having a normal diameter slightly smaller than the diameter of lamp mounting portion 32 is forced over portion 32 until it abuts panel 35 to retain the pilot light assembly 30 in place. A circular slot 36 is formed in lamp mounting portion 32 adjacent to panel 35 so that coils 34a of spring 34 adjacent to panel 35 tend to spring inwardly within groove 36 and hold spring 34 in place. Lamp 37 is slipped into place adjacent the rear end of portion 32 by forcing it beneath several of the coils 34b of spring 34. These coils 34b are preferably bent outwardly from the remainder of the coils of spring 34 so that they form a slight angle therewith to facilitate the insertion of lamp 37.

Figs. 8 and 9 show the pilot light assembly of Figs. 6 and 7 having a reflector means 40 and a coloring means 42 added. The reflector means comprises a shaped plate 40 formed with a suitable shiny inner surface 41. This plate may be slipped over the lamp member 41 opposite the light pervious lamp supporting portion 32 to reflect the lamp rays forwardly through portion 32. Reflector 40 is shown in Figs. 8 and 9 being used with the embodiment having the helical spring clip. It is clear that such a reflector may be used also with the embodiments shown in the other figures. Figs. 8 and 9 show a coloring means 42 inserted between lamp 37 and light pervious support means 32. This coloring means comprises a transparent or translucent colored insert 44 colored as desired which may have any suitable shape to slide between the lamp and the lamp support. The colored insert may also be used with the embodiments shown in the other figures.

Figs. 10 and 11 show another embodiment comprising pilot light 44 in which the light pervious member having the forward jewel portion 45 and a rearwardly extending lamp mounting portion 43 is fitted into a snap ring tube 47. Lamp mounting portion 43 has an annular groove 49 which snaps into a cooperating annular groove 48 in tube 47 to hold the light pervious member in place in the tube. Tube 47 is fitted into an appropriately shaped aperture in panel 46 where it is held in place by a friction fit, by threads or by other suitable fastening means. Lamp 51 is slipped into place against portion 43 through apertures 50 in tube 47 so that lamp 51 is approximately parallel to panel 46 and has its glowing portion adjacent to light pervious portion 43. Light rays from lamp 51 are transmitted through portion 43 to jewel portion 45.

Fig. 12 shows another embodiment comprising a pilot light 52 to which a lens 58 has been added. The center of the lamp mounting portion 57 extending rearwardly from jewel portion 54 is hollow and a lens 58 is mounted therein in a suitable groove 59. A lamp 61 is mounted on the end of portion 57 in any one of the above described manners. Lens 58 is shaped to focus the rays from lamp 61 on the rear 54a of jewel portion 54 to increase the light intensity at the jewel and also to enlarge the illuminated area of the jewel.

It will be seen that the present invention provides a pilot light of relatively simple and inexpensive construction. The pilot light is especially adapted for use with the miniature, baseless neon types of lamps which previously have been mounted only by the use of either relatively complicated and expensive pilot light assemblies or have been attached to an instrument panel in a more or less permanent fashion, making their original insertion or replacement difficult. The present pilot light provides a mounting whereby lamps such as the neon glow lamps having extremely low wattage nevertheless provide a brilliant illumination of the pilot light jewel. This is accomplished by the provision for mounting the lamp parallel to the panel whereby maximum use is made of the illuminated area within the lamp. The light rays from the illuminated area of the lamp are conducted by the light pervious lamp support to the forward jewel portion to assure an efficient light transmission. A pilot light is thus provided having a minimum number of parts and which is easily installed in the first instance and in which the lamp is easily replaced in the event of lamp failure. Although being easily installed and providing for easy replacement, the pilot light and the inserted lamp are tightly held in place on a panel and thus will neither rattle nor shake loose when the instrument panel is subjected to jarring or vibration. The pilot light is also adaptable for a variety of uses due to its small size and low wattage and also due to the fact that the jewel color may be changed by the simple insert members disclosed above.

As various changes may be made in the above embodiment without departing from the spirit of the invention, it is to be understood that all matter herein set forth is to be interpreted as illustrative and not in a limiting sense.

Having thus described our invention, we claim:

1. A pilot light for mounting on a panel comprising a light pervious member having a front jewel portion with a rearwardly facing shoulder portion to abut the panel and having a rearwardly extending lamp mounting portion adapted to pass through an aperture in the panel and a slot in said lamp mounting portion adapted to grip a lamp in a position generally parallel to the panel whereby said pilot light may be positioned with the panel gripped between said shoulder and the lamp.

2. A pilot light and lamp assembly for panel mounting comprising a light pervious member having a front jewel portion with a rearwardly facing shoulder portion adapted to abut a front surface of the panel and having an integral light pervious lamp mounting portion extending rearwardly therefrom and adapted to extend through an aperture in the panel and having a lamp positioning surface thereon adapted to engage the lamp surface to orient the lamp behind the panel in a position generally parallel thereto, a spring member adjacent said lamp positioning surface gripping said lamp mounting portion and adapted to hold a lamp in contact with said lamp positioning surface, a lamp held by said spring member, and a light pervious colored insert positioned between said lamp and said lamp mounting portion whereby light rays passing from said lamp to said lamp mounting portion are colored in accordance with the color of said insert.

3. A pilot light and lamp assembly for panel mounting comprising a light pervious member having a front jewel portion with a rearwardly facing shoulder portion adapted to abut a front surface of the panel and having an integral light pervious lamp mounting portion extending rearwardly therefrom and adapted to pass through an aperture in the panel and having a lamp positioning surface thereon adapted to engage the lamp surface to orient the lamp behind the panel in a position generally parallel thereto, a spring member adjacent said lamp positioning surface gripping said lamp mounting portion and adapted to hold a lamp in contact with said lamp positioning surface, a lamp held by said spring member against said lamp mounting positioning surface and a reflector positioned on the side of said lamp opposite the side held against said lamp positioning surface whereby light rays from said lamp are reflected by said reflector toward said jewel portion.

4. A pilot light for mounting on an apertured panel comprising a homogeneous light pervious member having a front jewel portion with a shoulder adapted to abut the front side of the panel and having a rearwardly extending lamp mounting portion adapted to pass through the panel aperture, a lamp mounting slot in said lamp mounting portion spaced to pass forwardly of the rear wall of the panel whereby a lamp may be fitted into said slot generally parallel with the panel with its extremities resting against the rear wall of the panel and with its intermediate portion entering at least partially into the aperture to thereby restrict movement of the lamp parallel to the panel.

5. A pilot light and lamp assembly on an apertured panel comprising a homogeneous light pervious member having a jewel portion with a shoulder abutting the panel front and having a rearwardly extending lamp mounting portion passing through the panel aperture, a lamp mounting slot in said lamp mounting portion passing forwardly of the rear wall of the panel, and a lamp with its center portion positioned in said slot generally parallel to the panel and at least partially entering the panel aperture and with its opposite extremities contacting the rear wall of the panel whereby said lamp and said pilot light are held in fixed relation on the panel.

6. A pilot light for panel mounting comprising a member of light pervious material having a front jewel portion with a rearwardly facing shoulder portion adapted to abut a front surface of the panel and having an integral light pervious lamp mounting portion extending rearwardly therefrom and adapted to extend through an aperture in the panel and having a lamp positioning surface thereon adapted to engage the lamp surface to orient the lamp behind the panel in a position generally parallel thereto, and a lamp gripping member adjacent said lamp positioning surface adapted to hold the lamp in contact with the lamp positioning surface whereby light rays from the lamp are transmitted through said lamp mounting portion to the jewel portion.

7. The pilot light as claimed in claim 6, in which said gripping member comprises a spring connected to said lamp mounting portion having a surface adapted to engage said lamp.

8. The pilot light as claimed in claim 7 in which said gripping member comprises a spring clip having an apertured portion engaging said lamp mounting portion and an integral lamp engaging portion.

9. The pilot light as claimed in claim 6 in which said gripping member comprises a spiral spring fitted over said lamp mounting portion having a spiral extending rearwardly of the rear portion of said lamp mounting portion forming a lamp holder.

10. The pilot light as claimed in claim 9 in which said lamp mounting portion has a recess to accommodate a portion of said spiral spring.

References Cited in the file of this patent

UNITED STATES PATENTS

| | | |
|---|---|---|
| 945,049 | Russell | Jan. 4, 1910 |
| 1,179,392 | Bambeck | Apr. 18, 1916 |
| 1,664,684 | Helgeby | Apr. 3, 1928 |
| 1,673,876 | Koeppler | June 19, 1928 |
| 2,051,288 | Curtis | Aug. 18, 1936 |
| 2,214,317 | Bash et al. | Sept. 10, 1940 |
| 2,221,078 | Dotterer | Nov. 12, 1940 |
| 2,420,000 | Linton | May 6, 1947 |
| 2,617,910 | Slarraz y Segura | Nov. 11, 1952 |